(12) United States Patent
Sachedina et al.

(10) Patent No.: US 8,024,741 B2
(45) Date of Patent: *Sep. 20, 2011

(54) DYNAMIC LATCH REQUEST SCALING BACK FUNCTION TO CONDITIONALLY PLACE TASK IN SUSPENDED STATE

(75) Inventors: Aamer Sachedina, Richmond Hill (CA); Matthew A. Huras, Ajax (CA); Keriley K. Romanufa, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 1467 days.

This patent is subject to a terminal disclaimer.

(21) Appl. No.: 11/457,572

(22) Filed: Jul. 14, 2006

(65) Prior Publication Data

US 2006/0248532 A1    Nov. 2, 2006

Related U.S. Application Data

(63) Continuation of application No. 09/844,470, filed on Apr. 27, 2001, now Pat. No. 7,111,295.

(30) Foreign Application Priority Data

Apr. 28, 2000   (CA) ..................................... 2306969

(51) Int. Cl.
*G06F 9/46*   (2006.01)

(52) U.S. Cl. ......... 718/107; 718/100; 718/102; 718/108
(58) Field of Classification Search .................. 718/100, 718/102, 107, 108
See application file for complete search history.

(56) References Cited

U.S. PATENT DOCUMENTS

| | | | |
|---|---|---|---|
| 4,809,157 A * | 2/1989 | Eilert et al. | 718/104 |
| 5,077,677 A | 12/1991 | Murphy et al. | 395/10 |
| 5,274,809 A * | 12/1993 | Iwasaki et al. | 718/104 |
| 5,790,851 A * | 8/1998 | Frank et al. | 718/104 |
| 5,812,844 A | 9/1998 | Jones et al. | 395/674 |
| 5,826,079 A | 10/1998 | Boland et al. | 395/672 |
| 6,687,904 B1 * | 2/2004 | Gomes et al. | 718/102 |
| 6,834,386 B1 * | 12/2004 | Douceur et al. | 718/107 |
| 7,111,295 B2 * | 9/2006 | Sachedina et al. | 718/100 |

* cited by examiner

*Primary Examiner* — Kenneth Tang
(74) *Attorney, Agent, or Firm* — John E. Campbell; Kevin P. Radigan, Esq.; Heslin Rothenberg Farley & Mesiti P.C.

(57) ABSTRACT

A computer system dynamically scales back latch requests for system resources. Tasks seeking access to system resources each dynamically determine the probability that the task will gain access to the latch relating to a given system resource. Where the task estimates that its probability is below a defined threshold, the task will suspend itself for a defined sleep time. The task dynamically adjusts the length of the sleep time based on the number of times the task enters the suspended state and on the relative changes in the estimated probability that the task will gain access to the resource.

20 Claims, 1 Drawing Sheet

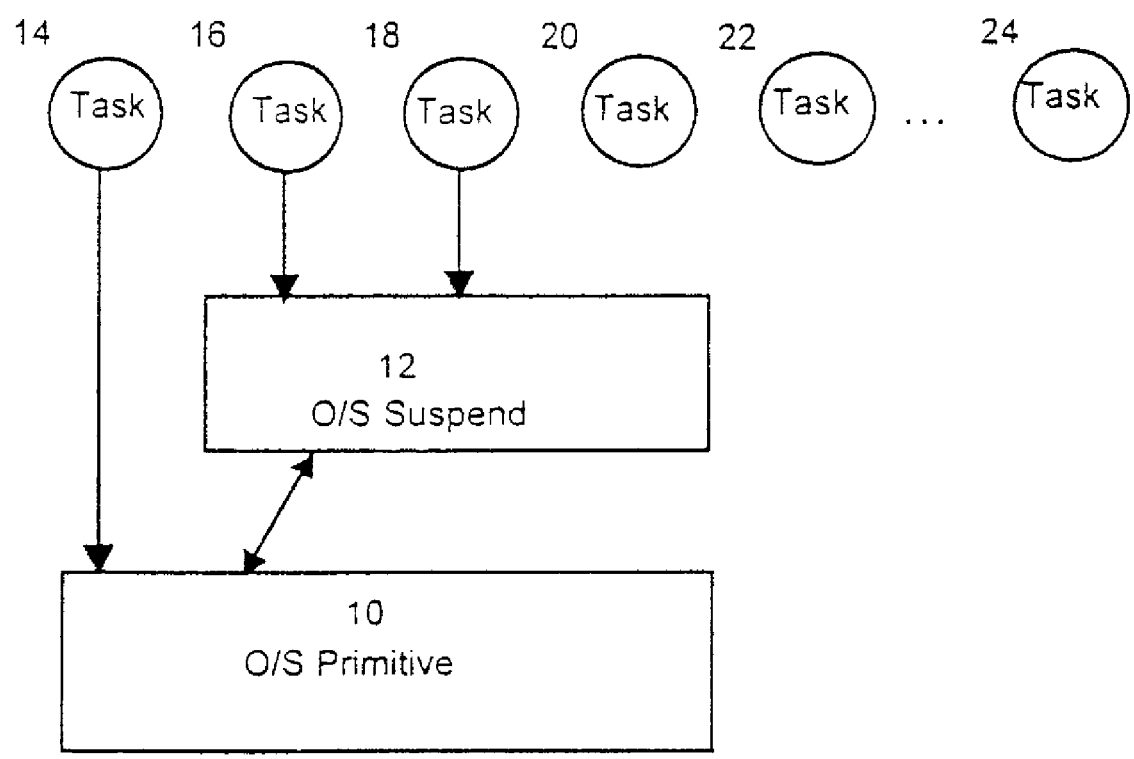

DYNAMIC LATCH REQUEST SCALING BACK FUNCTION TO CONDITIONALLY PLACE TASK IN SUSPENDED STATE

CROSS-REFERENCE TO RELATED APPLICATIONS

This application is a continuation of co-pending U.S. patent application Ser. No. 09/844,470, filed Apr. 27, 2001, and published on Nov. 29, 2001 as U.S. Patent Publication No. US 2001/0047382 A1, entitled "Dynamic Scaling Back of Latch Request for Computer System Resources", by Sachedina et al., the entirety of which is hereby incorporated herein by reference. Further, this application and application Ser. No. 09/844,470 claim priority from Canadian patent application number 2,306,969, filed Apr. 28, 2000, the entirety of which is also hereby incorporated herein by reference.

TECHNICAL FIELD

The present invention is directed to an improvement in computing systems and in particular to an improved system for dynamically scaling back latch requests for computer system resources.

BACKGROUND ART

In a multitasking computer system, tasks that require exclusive access to a system resource or a critical section of code are typically required to obtain a latch to serialize such access. Only one task (or thread/process) can hold a latch at any particular time. Other tasks seeking access to the system resource will wait on the latch and are suspended until the latch is freed by the current holder of the latch.

The common method of implementing a latch in application software is for all waiters to wait on a lower level primitive provided by the operating system. Common primitives include semaphores and message queues (depending on the implementation of the latch). Tasks requesting a latch ("requesters") will, after unsuccessfully attempting to get the latch, wait on the appropriate operating system resource. Because the requesters are waiting on an operating system primitive, the operating system suspends the requesters waiting on the latch (in fact the lower level primitive) while a task continues to hold the latch. When the latch is freed, the operating system permits the requesting suspended tasks to resume. The result is that each of the requesting tasks competes with each other to obtain the latch. As is apparent, as the number of tasks increases, the resumption of each requester task when a latch is freed will cause a greater use of system resources (including CPU time) as each task will seek to acquire the operating system primitive.

Prior art systems provide for assigning priorities and dispatch classes to program threads to permit application programs to influence the schedule of execution for program threads (see for example U.S. Pat. No. 5,630,128, Farrell). However, such systems do not prevent the contention for the operating system primitives described above for threads having the same priority in the same dispatch class.

It is therefore desirable to have a system that permits tasks to request a latch without placing excessive demands on system resources when the latch is released and requester threads seek to obtain the latch.

SUMMARY OF THE INVENTION

According to one aspect of the present invention, there is provided an improved system for dynamically scaling back latch requests for computer system resources.

According to another aspect of the present invention, there is provided a computer system including tasks potentially contending for a latch, each task including a probability determining component to dynamically estimate the probability that the task will successfully acquire the latch, the task including a suspending component to place the task in a suspended state for a defined sleep time where the estimated probability is below a predetermined threshold value.

According to another aspect of the present invention, there is provided the above computer system in which the suspending component increments the defined sleep time by a heuristically determined constant factor for successive entries of the task into the suspended state.

According to another aspect of the present invention, there is provided the above computer system in which the suspending component adjusts the defined sleep time in accordance with changes in the estimated probability that the task will successfully acquire the latch.

According to another aspect of the present invention, there is provided the above computer system in which the suspending component bases the defined sleep time on a predicted number of instructions executed under the latch as calculated by a sample workload measurement.

According to another aspect of the present invention, there is provided the above computer system in which the sleep time is capped at a predetermined maximum value.

According to another aspect of the present invention, there is provided the above computer system in which the probability determining component estimates the probability that the task will successfully acquire the latch by taking the inverse of the number of tasks contending for the latch.

According to another aspect of the present invention, there is provided a method for the management of contention for a latch by a task in a multitask computer system, the method including, for instance:

the task dynamically estimating the probability that the task will successfully acquire the latch, the task placing itself in a suspended state for a defined sleep time where the estimated probability is below a predetermined threshold value, and the task repeating the above steps until the dynamically estimated probability of the task acquiring the latch is at or above the predetermined threshold value, following which the task will contend for the latch.

According to another aspect of the present invention, there is provided a program storage device readable by a multitasking machine, tangibly embodying a program of instructions executable by the machine to perform the above method steps for managing contention for a latch by a task.

Advantages of the present invention include reduced contention for latches due to voluntary suspension of tasks and the dynamic determination by a task of whether it should suspend itself and for how long.

BRIEF DESCRIPTION OF THE DRAWINGS

One embodiment of the invention is shown in the drawing, wherein:

FIG. 1 is a block diagram showing example tasks seeking an operating system primitive illustrating the using of an embodiment of the invention.

In the drawing, an embodiment of the invention is illustrated by way of example. It is to be expressly understood that the description and drawing are only for the purpose of illustration and as an aid to understanding, and are not intended as a definition of the limits of the invention.

BEST MODE FOR CARRYING OUT THE INVENTION

FIG. 1 is a block diagram showing operating system primitive 10 used to implement a latch for a computer system resource. The operating system suspend function is shown diagrammatically by operating system suspend 12. FIG. 1 shows example tasks 14, 16, 18, 20, 22, 24. In FIG. 1, task 14 is shown holding the latch by being granted access to the operating system primitive implementing the latch (typically either a semaphore or a message queue). Tasks 16, 18 are shown as requester tasks that have sought access to operating system primitive 10 but have been suspended by the operating system and are shown as being in operating system suspend 12. When task 14 releases the latch by releasing operating system primitive 10, the operating system resumes both tasks 16, 18 which both contest for operating system primitive 10.

For computer systems that have more than one processor (Symmetric Multiple Processor or SMP systems), these newly unsuspended tasks typically "spin" on the latch. Thus each of tasks 16, 18 attempts to continually acquire the latch until either:

The task acquires the latch (is granted access to operating system primitive 10), or The task reaches a pre-determined spinning threshold. The spinning threshold is a time past which the task will not continue to spin on the latch. The task then returns to waiting on operating system primitive 10 and is placed in operating system suspend 12.

Some latches in an application are highly contested (there are many tasks seeking access to the latches) since they serialize access to popular system resources or critical sections of code in the application (in this description, a critical section of code may be considered a system resource as conceptually the code is treated in the same manner as a resource). Using the common technique of latching described above, the underlying operating system latching primitive (such as the semaphore, or message queue) is highly used and potentially becomes a significant bottleneck in the serialization of access to the system resource.

For example, assume that a system has a latch which on average has "n" waiters. When the task holding the latch frees it, the operating system does the work of resuming the operation of the n waiting tasks and each task competes again for access to the latch. As n grows larger, the processor time required for each task to compete for access to the latch every time a latch is acquired or freed increases and the probability that any one task will get the latch goes down. Even in the face of such bad probabilities, each task is allowed to execute and use a CPU time slice. Since there exist a finite number of processors on computer systems, a potentially significant cost will be incurred in context switching carried out by the processors to accommodate the n−1 tasks that do not acquire the latch. The n−1 tasks each get a CPU time slice to compete for the latch (to spin on the latch). When those tasks do not acquire the latch they each will be placed in operating system suspend 12 because only one task among these n will be able to acquire it. This excessive competition for a common resource degrades system performance.

According to an embodiment of the present invention, there is provided a system to reduce the latch requests made when tasks contend for computer system resources. The embodiment bases latch requests for a resource on the dynamic probability that a task will obtain the latch. The latch requests are scaled back where the probability of latch acquisition dictates that tasks will have a poor chance of obtaining the latch.

In one embodiment a task will dynamically determine that it will not contest for a latch where the probability of obtaining the latch is estimated to be below a defined value. Instead, the task will suspend itself. By tasks voluntarily suspending execution if the probability of acquiring a latch is not reasonably good, only a fraction of requesters of a latch actually wait on the underlying operating system primitive, and only this fraction will compete for the latch every time a latch is freed.

This voluntary reduction of competition serves to reduce contention on the underlying operating system primitive used for latching and to lower the average context switching time thereby increasing overall system performance.

A requestor of a latch voluntary suspends its execution based on its probability judgment before it competes for the latch by spinning, thus ensuring that no CPU time is wasted by a task that does not have a reasonable probability of successfully acquiring the latch.

This approach may be seen in FIG. 1 where task 14 has the latch and tasks 16, 18 are waiting on the latch. Tasks 20, 22 may determine that the chance of obtaining the latch are not sufficiently high and each task will suspend itself. As a result, when operating system primitive 10 is released by task 14, only tasks 16, 18 will be resumed by the operating system and tasks 20, 22 will not contend for the latch. The result is that instead of four tasks spinning on the latch, only the two tasks 16, 18 will use CPU time to spin on the latch.

As will be appreciated, performance will depend on the probability threshold used to determine whether a given task will voluntarily suspend itself, and on the length of time for which each task suspends itself.

One embodiment is able to dynamically calculate the length for a task to voluntarily suspend itself. One way used by the embodiment is to include a constant factor increase for the length of the suspension. The embodiment uses a sleep mechanism which takes a sleep_time parameter defining the length that the task is suspended. The value is set at a predetermined preliminary value. Each successive time that the requester determines it will voluntarily suspend its execution, the sleep time is increased by a constant factor.

In one embodiment, the sleep time is also adjusted based on a change in the estimated probability of successfully acquiring the latch under competition. Where the probability of acquiring a latch decreases between successive suspensions, the length of the sleep_time is made greater. In the embodiment, the value of sleep_time can be capped to a maximum determined sleep time. The values of the preliminary sleep_time variable, and the constant factors used to increase the sleep_time variable will depend on the computer system and system usage and may be heuristically determined for different implementations of the embodiment.

A second way to determine the length of the sleep_time for a task is by prediction based on a sample workload. The number of instructions executed by an application while holding the latch is determined by running sample workloads on the computer system. With this information the sleep_time can be dynamically adjusted to be the amount of time that will likely need to elapse before the probability of successful acquisition of the latch under competition is favourable. The effectiveness of this technique is dependent on how closely the actual number of instructions computed under the latch matches the estimate predicted by extrapolation from the sample workload.

It may be possible in some circumstances to track the number of instructions actually executed under a latch at run-time and use this information to generate a better estimate of sleep time than one based on a sample workload. However, such an approach requires a significant overhead that is generally too high for practical use as latching code is usually performance critical.

For this reason, the dynamic calculation of the probability of successfully acquiring a latch for a given task is also to be kept as efficient as possible. In one embodiment, the probability is calculated by simply basing the value on the number of waiters on the latch. This value is typically available in the system implementing the latch. The probability of accessing the latch is then the inverse of the number of waiting tasks. The value of the probability that is used for the threshold will be heuristically determined for the system and system usage in question.

An example of this efficient approach to the dynamic calculation of probability of acquiring the latch is where it is heuristically determined that any probability above P=10% (where P is the probability of acquiring the latch under contest) is a "contestable" situation. The pseudo code to determine if a task will voluntarily suspend itself (where num_waiters is the variable representing the number of waiting tasks) is then expressed as "if (num_waiters<10)."

An example piece of pseudo code to implement one embodiment is set out below. In the example, the constant factor approach to the sleep_time value determination is used. The constant factor increase where a task is repeatedly suspending itself is defined as 2 in the example. Where the probability of accessing the latch is determined to be worse between successive suspensions of the task, the constant factor increase is defined to be 4.

```
// Pl is the probability of acquiring the latch under competition and
is calculated as // defined above. The variable x is the probability
   // threshold value, determined heuristically.
TRY_FOR_LATCH:
if (Pl < x)
{
   // The task is not to compete for the latch until the
   // probability is better
   // Set sleep_time to the defined preliminary value
   sleep_time = START_SLEEP_TIME;
   do {
      // The task suspends itself; dynamically determining the
      // length of each suspension for each time it is woken up
      // (if further suspension is necessary)
      sleep(sleep_time)
      sleep_time = sleep_time*2
      Pl_old = Pl;
      recalculate Pl
      if (Pl < Pl_old) then
         sleep_time = sleep_time*4
      if (sleep_time > MAX_SLEEP_TIME)      //capped value for
                                            //sleep_time
         sleep_time = MAX_SLEEP_TIME
   } while (Pl < x)
}
// The task will compete for the latch since the probability that
// we the task will get it is reasonable (Pl >= x)
Loop: Spin to acquire the latch until the latch is acquired, or   the
spinning threshold is reached
If latch not acquired
{
Wait: on the latch by waiting on the operating system primitive
When the operating system resumes this task, compete for the latch again:
retry from TRY_FOR_LATCH
}
```

An alternative implementation of the preferred embodiment includes a calculation of the sleep_time variable using prediction based on sample workload. In the example, it is assumed that the probability threshold x=10%. The following pseudo code calculates sleep_time based on the predicted time for the probability (P1) to drop to acceptable levels.

```
while (numwaiters > 10)
{
   // The task suspends itself, dynamically determining how long
   // a suspension is to be made for each time the task is woken up
   (if further suspension is necessary)
   sleep(sleep_time)
   sleep_time = (numwaiters−10) * average # of instructions under
      latch from sample workload measurements * average time to
      execute one instruction on this computer
   if (sleep_time > MAX_SLEEP_TIME)
      sleep_time = MAX_SLEEP_TIME
}
```

As may be seen from the above pseudo code examples, one embodiment provides for an efficient determination of the probability of a task being able to acquire a latch and for determining a time during which a task will suspend itself if the probability of acquiring the latch is too slight. The result is a system permitting a dynamic scaling back of latch requests and a corresponding reduction in contention for the latch.

Although an embodiment of the present invention has been described here in detail, it will be appreciated by those skilled in the art, that variations may be made thereto. Such variations may be made without departing from the spirit of the invention or the scope of the appended claims.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

What is claimed is:

1. A computer system comprising:
   a memory; and
   a processor in communications with the memory, wherein the computer system further comprises:
      tasks potentially contending for a latch, each task comprising:
         a probability determining component to dynamically estimate the probability that the task will successfully acquire the latch; and
         a suspending component to place the task in a suspended state for a defined sleep time where the estimated probability is below a predetermined threshold value.

2. The computer system of claim 1 in which the suspending component increments the defined sleep time by a heuristically determined constant factor for successive entries of the task into the suspended state.

3. The computer system of claim 2 in which the sleep time is capped at a predetermined maximum value.

4. The computer system of claim 1 in which the suspending component adjusts the defined sleep time in accordance with changes in the estimated probability that the task will successfully acquire the latch.

5. The computer system of claim 4 in which the sleep time is capped at a predetermined maximum value.

6. The computer system of claim 1 in which the sleep time is capped at a predetermined maximum value.

7. The computer system of claim 1 in which the probability determining component estimates the probability that the task will successfully acquire the latch by taking the inverse of the number of tasks contending for the latch.

8. A method for the management of contention for a latch by a task in a multitask computer system, the method comprising:
   a. the task dynamically estimating the probability that the task will successfully acquire the latch;
   b. the task placing itself in a suspended state for a defined sleep time where the estimated probability is below a predetermined threshold value; and
   c. the task repeating the above a and b until the dynamically estimated probability of the task acquiring the latch is at or above the predetermined threshold value, following which the task will contend for the latch.

9. The method of claim 8, further comprising incrementing the defined sleep time by a heuristically determined constant factor for successive entries of the task into the suspended state.

10. The method of claim 9, further comprising capping the defined sleep time at a predetermined maximum value.

11. The method of claim 8, further comprising adjusting the defined sleep time in accordance with changes in the estimated probability that the task will successfully acquire the latch.

12. The method of claim 11, further comprising capping the defined sleep time at a predetermined maximum value.

13. The method of claim 8, further comprising capping the defined sleep time at a predetermined maximum value.

14. The method of claim 8, wherein the estimating the probability that the task will successfully acquire the latch comprises taking the inverse of the number of tasks contending for the latch to define the probability.

15. A non-transitory computer readable medium readable by a multitasking machine, tangibly embodying a program of instructions executable by the machine to perform a method for the management of contention for a latch by a task in a multitask computer system, the method comprising:
   a. the task dynamically estimating the probability that the task will successfully acquire the latch;
   b. the task placing itself in a suspended state for a defined sleep time where the estimated probability is below a predetermined threshold value; and
   c. the task repeating the above a and b until the dynamically estimated probability of the task acquiring the latch is at or above the predetermined threshold value, following which the task will contend for the latch.

16. The non-transitory computer readable medium of claim 15, wherein the method further comprises incrementing the defined sleep time by a heuristically determined constant factor for successive entries of the task into the suspended state.

17. The non-transitory computer readable medium of claim 16, wherein the method further comprises capping the defined sleep time at a predetermined maximum value.

18. The non-transitory computer readable medium of claim 15, wherein the method further comprises adjusting the defined sleep time in accordance with changes in the estimated probability that the task will successfully acquire the latch.

19. The non-transitory computer readable medium of claim 18, wherein the method further comprises capping the defined sleep time at a predetermined maximum value.

20. The non-transitory computer readable medium of claim 15, wherein the estimating the probability that the task will successfully acquire the latch comprises taking the inverse of the number of tasks contending for the latch to define the probability.

* * * * *